July 31, 1962 A. A. GAMBREL 3,047,492
SEWAGE DIGESTING PROCESS
Filed Jan. 22, 1959
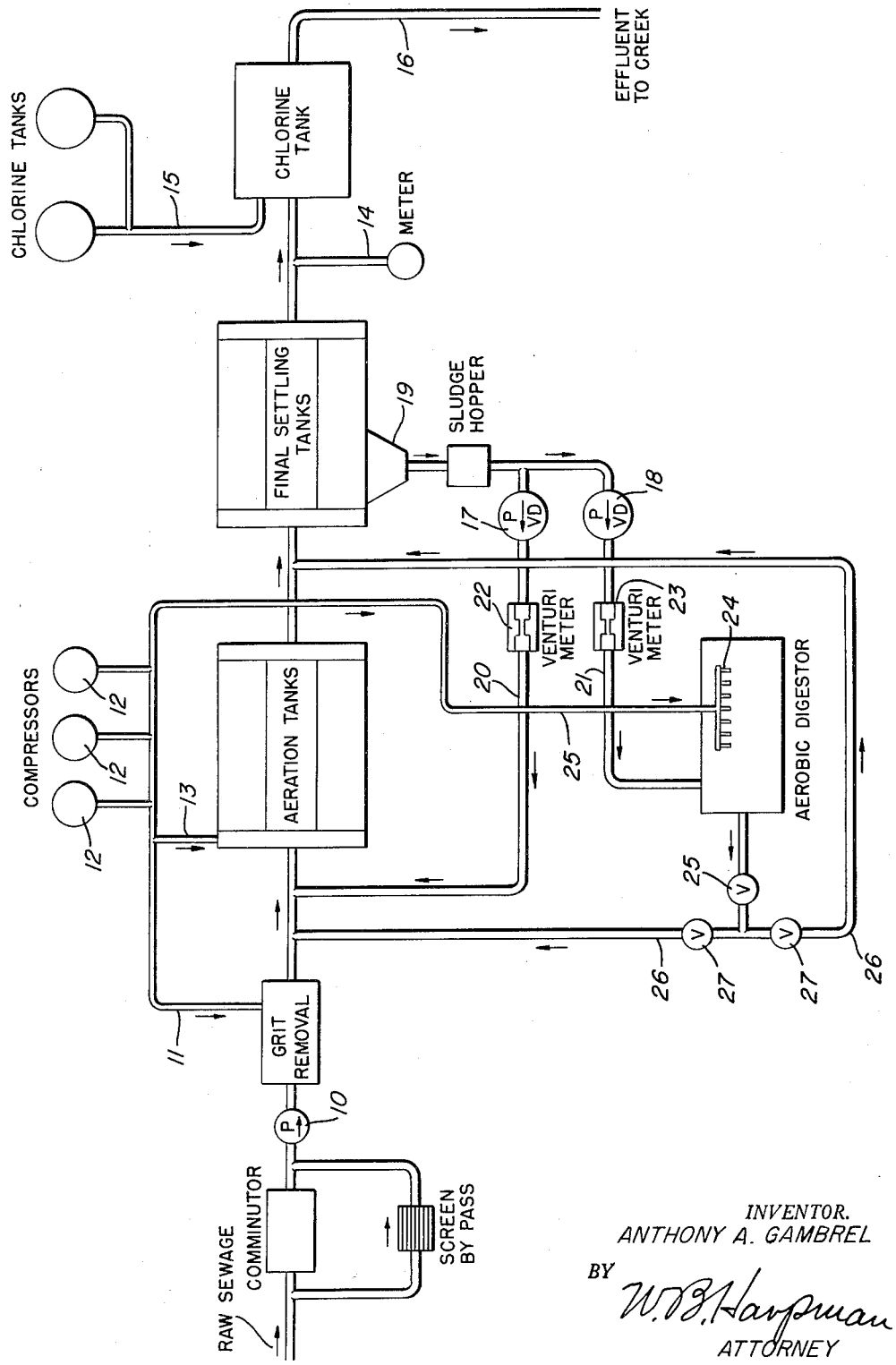
INVENTOR.
ANTHONY A. GAMBREL
BY
W. B. Harpman
ATTORNEY

3,047,492
SEWAGE DIGESTING PROCESS
Anthony A. Gambrel, 751 Wildwood Drive,
Youngstown 12, Ohio
Filed Jan. 22, 1959, Ser. No. 788,301
6 Claims. (Cl. 210—7)

This invention relates to a sewage disposal process and more particularly to a method of sewage disposal incorporating a modified activated sludge system with aerobic digestion.

The principal object of the invention is the provision of a modified activated sludge process that eliminates the sludge within the system by aerobic digestion.

The further object of the invention is the provision of a modified activated sludge sewage disposal process that does not require anaerobic digestors.

A still further object of the invention is the provision of a modified activated sludge sewage disposal process that does not require sludge beds for sludge disposal.

A still further object of the invention is the provision of a modified activated sludge sewage disposal process incorporating an aerobic digestor receiving and digesting approximately 3% of the total daily flow in a period of 10 to 13 days to eliminate sludge in the system.

A still further object of the invention is the provision of a modified activated sludge sewage disposal process which requires no primary settling tanks.

A still further object of the invention is the provision of a modified activated sludge sewage disposal process in which the final product comprises a clear liquid with suspended inert ash invisible to the naked eye.

A still further object of the invention is the provision of a modified activated sludge sewage disposal process which eliminates unsightly sludge beds, anaerobic digestors and sludge handling equipment.

The sewage disposal process disclosed herein comprises an improvement in the art and particularly with respect to the activated sludge type of sewage treatment process heretofore known and practiced. The present invention provides a considerably modified activated sludge type of sewage treatment and eliminates the sludge beds, anaerobic digestors and costly sludge handling equipment heretofore believed necessary. Additionally, the presently disclosed invention eliminates the production of sludge by this process and produces a final effluent which is clear and which can be safely discharged into a creek or stream. The modified activated sludge sewage disposal system disclosed herein incorporates a separate and distinct stage wherein most of the sludge from the settling tanks and comprising approximately 25% of the daily intake of the plant is returned to the aeration tanks of the system while approximately 3% thereof is diverted to an aerobic digestor where it is detained for approximately 10 to 15 days and completely digested to produce an inert invisible ash and clear liquid which is then returned to the system.

With the foregoing and other objects in view which will appear as the description proceeds, the invention resides in the method hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

The FIGURE is a diagrammatic flow-sheet illustrating the modified activated sludge sewage disposal process.

By referring thereto it will be seen that raw sewage flows into a comminutor which, as known in the art, comprises a mechanical device for cutting up the sewage wastes into relatively small particles. As is customary in the art, a screened bypass is provided around the comminutor and is used for screening sewage if comminutors are out of service or if the flow exceeds the machine capacity. The sewage flowing from the comminutor and/or the screened bypass enters a pump 10 which moves the sewage into a grit removal device known in the art as an air-degritter. Compressed air for actuating the grit removal device is supplied through a line 11 from a plurality of air compressors 12, 12. Sewage flowing from the grit removal device is conveyed into aeration tanks which are provided with diffusers, as known in the art. The diffusers are supplied with compressed air by way of an air line 13. The sewage is aerated in the aeration tanks for nine (9) hours or more depending on the nature of the sewage being treated. The aerated sewage then flows from the aeration tanks to settling tanks where it is retained for approximately four hours. The sludge is separated from the sewage in the settling tanks and the effluent, approximately 75% of the daily volume of sewage flowing into the system, flows through a metered connection 14 into a chlorine tank where it is retained for approximately 15 minutes. Chlorine from chlorine tanks is supplied to the chlorine tank by way of a line 15. A discharge line 16 leading to a suitable point of disposal such as a creek or a stream is provided for the effluent leaving the chlorine tank.

Those skilled in the art will observe that in the process herein disclosed the sewage is initially subjected to three stages of treatment; 1, the aeration tanks, 2, the settling tanks and 3, the chlorine tanks to eliminate 75% of the daily volume flow of sewage in the form of clear chlorinated effluent which may be safely and conveniently disposed of. The remaining 25% comprises sludge which is continuously withdrawn from the settling tanks into a sludge hopper by means of variable drive pumps 17 and 18 both of which communicate with the sludge hopper which in turn communicates with portion 19 of the settling tanks. The output of the pumps 17 and 18 is discharged into lines 20 and 21 respectively both of which incorporate venturi type meters 22 and 23 respectively. The line 20 communicates with the sewage line entering the aeration tanks as heretofore described and approximately 88% of the sludge delivered to the sludge hopper is recirculated to the aeration tanks. The solids in the sludge are broken down by this recycling through the aeration tanks and the volume reduced.

The line 21 delivers sludge from the sludge hopper to an aerobic digestor which is provided with diffusers 24 which are in turn supplied with compressed air by way of an air line 25. The aerobic digestor retains 12% of the sludge for 10 to 15 days (3% of the total daily flow of sewage into the plant), depending on the nature of the sewage, and during that time completely digests the sludge. The residue product comprises inert ash invisible to the naked eye in a clear liquid effluent which is discharged from the aerobic digestor through a valved connection 25 and into a discharge line 26 which is provided with valves 27 and 28 on either side of the point of communication with the valve 25. The clear effluent from the aerobic digestor may thus be delivered to the intake side of the aeration tanks heretofore described or it may be delivered to the intake side of the settling tanks heretofore described, from where it will flow into chlorine tanks and then into the discharge line 16.

Those skilled in the art will observe that the aerobic digestion in the present sewage disposal process acts for a relatively long period of time on a relatively small proportion of the sludge produced by the process and eliminates this sludge by complete aerobic digestion.

Those skilled in the art will observe that if retention of sludge is desired as for sale for commercial purposes such sludge may be withdrawn from the aerobic digestor and thickened and filtered, as known in the art, to produce a dry commercial product.

The recycling of the majority of the sludge produced in the plant through the aeration tanks and settling tanks continues to reduce the volume of the sludge on each subsequent pass through the system.

It will thus be seen that the modified activated sludge sewage disposal process disclosed herein differs from the process heretofore known in the art in that no anaerobic digestors are employed as the sludge is digested by aerobic means. The system eliminates unsightly sludge beds, the anaerobic digestors and the costly sludge handling equipment heretofore believed necessary.

It will occur to those skilled in the art that the disclosed process continually disposes of sludge eliminating the heretofore believed necessary sludge build up and results in the removal of approximately 95% of the solids while delivering a clear effluent that can be safely discharged into any creek or stream.

It will thus be seen that the modified activated sludge sewage disposal process disclosed herein meets the several objects of the invention and having thus described my invention, what I claim is:

1. The process of sewage treatment which comprises exposing raw sewage to aerobic treatment through the forced introduction of atmospheric air thereinto in a first zone, moving the treated sewage into a second zone and settling the treated sewage to separate sludge and effluent therefrom, discharging said effluent from said second zone, moving about 88% of said separated sludge back to said first zone and mixing the same with raw sewage being introduced thereinto, re-exposing said 88% of said separated sludge to said aerobic treatment through said forced introduction of atmospheric air thereinto, moving the remaining 12% of said separated sludge to a third zone and exposing said 12% of said separated sludge to aerobic digestion in said third zone through the forced introduction of atmospheric air thereinto for a period of time sufficient to completely digest said last-mentioned sludge and form a clear effluent, and discharging said clear effluent into said first and second zones.

2. The process of sewage treatment comprising exposing 100% of the daily flow of raw sewage to forced aeration through the introduction of atmospheric air thereinto in a first zone, settling the aerated sewage to separate approximately 25% thereof as sludge and approximately 75% thereof as effluent in a second zone, discharging said effluent, re-exposing a portion of said separated sludge equal to approximately 22% of said total daily flow to said forced aeration in said first zone and exposing the remainder of said separated sludge comprising a portion thereof equal to approximately 3% of said total daily flow to continuous forced aerobic digestion through the forced introduction of atmospheric air thereinto in a third zone; characterized by digesting said remainder of sludge completely to form a clear effluent.

3. The process of sewage treatment comprising aerating raw sewage for approximately eight hours by introducing atmospheric air thereinto in a first zone, settling the aerated sewage for approximately three hours to separate sludge and effluent therefrom in a second zone, discharging said effluent, separating and re-exposing approximately 88% of the separated sludge to said forced aeration in said first zone together with additional raw sewage, and separating and exposing approximately 12% of said separated sludge to continuous aerobic digestion for approximately 12 days by continuously introducing atmospheric air thereinto in a third zone; characterized by digesting said 12% of said sludge completely to form a clear effluent.

4. The process of sewage treatment set forth in claim 3 and wherein said clear effluent is re-exposed to said first-mentioned aeration together with said raw sewage and resettled and the effluent resulting discharged along with said first-mentioned effluent.

5. The process of sewage treatment set forth in claim 3 and wherein said clear effluent is settled with said aerated sewage and discharged.

6. The process of sewage treatment which comprises exposing raw sewage to aerobic treatment through the forced introduction of atmospheric air thereinto in a first zone, moving the treated sewage into a second zone and settling the treated sewage to separate sludge and effluent therefrom, discharging said effluent from said second zone, moving at least 88% of said separated sludge back to said first zone and mixing the same with raw sewage being introduced thereinto, re-exposing said last mentioned separated sludge to said aerobic treatment through said forced introduction of atmospheric air thereinto, moving the remainder of said separated sludge to a third zone and exposing said remainder of said separated sludge in said third zone to continuous aerobic digestion through the forced introduction of atmospheric air thereinto for a period of time sufficient to completely digest said last-mentioned sludge and form a clear effluent, and discharging said clear effluent into said first and second zones.

References Cited in the file of this patent

UNITED STATES PATENTS

| | | |
|---|---|---|
| 2,154,132 | Mallory | Apr. 11, 1939 |
| 2,337,507 | Thayer | Dec. 21, 1943 |
| 2,359,004 | Schlenz et al. | Sept. 26, 1944 |
| 2,442,241 | Koruzo et al. | May 25, 1948 |
| 2,666,740 | Gordon | Jan. 19, 1954 |
| 2,786,025 | Lamb et al. | Mar. 19, 1957 |
| 2,901,114 | Smith et al. | Aug. 25, 1959 |

OTHER REFERENCES

"Total Oxidation Treatment," Kountz, Water and Sewage Works, June 1957, pages 276–277.

"Total Oxidation of Organic Wastes," Tapleshay, Sewage and Industrial Wastes, vol. 30, May 1958, pages 652–661.